Patented Oct. 8, 1929

1,730,536

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

PROCESS FOR THE PREPARATION OF A SUBSTITUTED GUANIDINE

No Drawing. Original application filed April 8, 1927, Serial No. 182,188. Divided and this application filed January 14, 1928. Serial No. 246,921.

The present invention relates to the manufacture and production of a new compound being chemically the p-di-methyl-amino-phenyl-o-tolyl guanidine having the following formula:

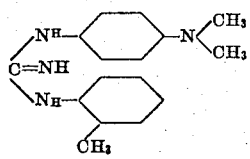

This compound has a very valuable use as an accelerator of the rubber vulcanization process and has been prepared by reacting o-tolyl-mustard oil with p-amino-di-methyl-aniline to produce a thiourea and then desulphurizing the thiourea so formed.

The thiourea desired was prepared preferably by reacting substantially 149 parts (1 molecular proportion) of o-tolyl-mustard oil with approximately 136 parts by weight (1 molecular proportion) of p-amino-di-methyl-aniline. The reaction that takes place is most conveniently represented as follows:

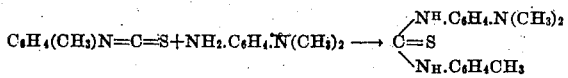

The thiourea so obtained was then desulphurized by treatment with a lead compound while warming under pressure in the presence of ammonia. Preferably, the ammonia was used in the form of an alcoholic solution thereof. The heating of the mass was continued for a period of time necessary to produce substantially complete combination of the substances, whereupon the mixture was allowed to cool, any excess of pressure was released, and the reaction product was filtered. The residuum was then washed with a dilute acid such as hydrochloric acid to separate any guanidine derivative from unchanged thiourea which remained in the product. The acid solution was then rendered slightly alkaline by the addition thereto of a suitable alkali, such as caustic soda solution, and the precipitated guanidine derivative so obtained was then filtered and washed and combined with the main bulk of the product obtained from the alcoholic liquor. The product can be be further purified, if such treatment be necessary, by dissolving the guanidine derivative in an acid and precipitating as before with caustic. The resulting product, p-di-methyl-amino-phenyl-o-tolyl-guanidine, has the composition represented by the following formula:

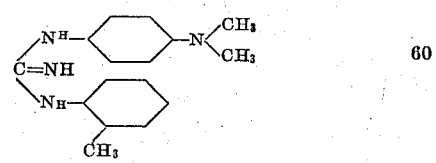

The example set forth is to be understood as illustrative only and not at all limitative of the invention. The invention is limited solely by the claims attached hereto as a part of this specification wherein it is intended to claim the invention as broadly as possible.

This case is a division of application Serial No. 182,188, filed April 8, 1927.

What is claimed is:

1. The process for making p-di-methyl-amino-phenyl-o-tolyl-guanidine which comprises reacting o-tolyl-mustard oil with p-amino-di-methyl-aniline to produce a thiourea and then desulphurizing the thiourea so formed.

2. The process for making p-di-methyl-amino-phenyl-o-tolyl-guanidine which comprises reacting o-tolyl-mustard oil with p-amino-di-methyl-aniline to produce a thiourea and then desulphurizing the thiourea so formed by treatment with a lead compound while warming under pressure in the presence of ammonia.

3. The process for making p-di-methyl-amino-phenyl-o-tolyl-guanidine which comprises reacting o-tolyl-mustard oil with p-amino-di-methyl-aniline to produce a thiourea and then desulphurizing the thiourea so formed by treatment with a lead compound while warming under pressure in the presence of an alcoholic solution of ammonia.

4. The process for making p-di-methyl-amine-phenyl-o-tolyl-guanidine which comprises reacting substantially equimolecular proportions of o-tolyl-mustard oil and p-amino-di-methyl-aniline to produce p-di-methyl-amino-phenyl-o-tolyl thiourea and then desulphurizing the thiourea so formed by treatment with a lead compound while warming under pressure in the presence of an alcoholic solution of ammonia, and isolating the p-di-methyl-amino-phenyl-o-tolyl-guanidine thus formed.

5. As a new article of manufacture a substituted guanidine, having the empirical formula $C_{16}H_{20}N_4$, said guanidine containing a tolyl and a dimethyl-anilino grouping.

6. As a new article of manufacture, p-di-methyl-amino-phenyl-o-tolyl-guanidine, having the formula

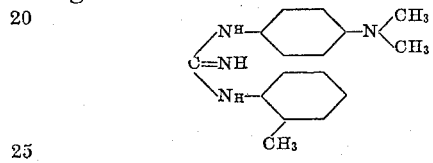

obtainable by reacting o-tolyl-mustard oil with p-amino-di-methyl-aniline to produce a thiourea and then desulphurizing the thiourea so formed.

In testimony whereof I hereunto affix my signature.

WINFIELD SCOTT.